US009465826B2

(12) United States Patent
Lakshminarayan et al.

(10) Patent No.: US 9,465,826 B2
(45) Date of Patent: Oct. 11, 2016

(54) ESTIMATING UNIQUE ENTRY COUNTS USING A COUNTING BLOOM FILTER

(71) Applicant: HEWLETT-PACKARD DEVELOPMENT COMPANY, L.P., Houston, TX (US)

(72) Inventors: Choudur Lakshminarayan, Austin, TX (US); Hansjorg Zeller, Los Altos, CA (US); QiFan Chen, Austin, TX (US); Ramakumar Kosuru, Austin, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 375 days.

(21) Appl. No.: 13/686,490

(22) Filed: Nov. 27, 2012

(65) Prior Publication Data

US 2014/0149433 A1     May 29, 2014

(51) Int. Cl.
*G06F 17/30*     (2006.01)

(52) U.S. Cl.
CPC ... *G06F 17/30306* (2013.01); *G06F 17/30699* (2013.01); *G06F 17/3033* (2013.01)

(58) Field of Classification Search
CPC ............... G06F 17/30699; G06F 17/3033
USPC ................................................. 707/750, 754
See application file for complete search history.

(56) References Cited

U.S. PATENT DOCUMENTS

| | | | |
|---|---|---|---|
| 6,865,567 B1* | 3/2005 | Oommen | G06F 17/30463 |
| 7,428,550 B2* | 9/2008 | Lakshminarayan | G06F 17/30536 |
| 7,620,624 B2 | 11/2009 | Stata et al. | |
| 7,769,751 B1* | 8/2010 | Wu | G06F 17/30699 707/728 |
| 8,005,868 B2* | 8/2011 | Saborit et al. | 707/796 |
| 8,190,598 B2* | 5/2012 | Al-Omari et al. | 707/718 |
| 8,209,368 B2* | 6/2012 | Beyer et al. | 708/300 |
| 8,214,517 B2* | 7/2012 | Dubnicki et al. | 709/231 |
| 8,229,930 B2* | 7/2012 | Cohen | G06Q 30/02 707/737 |
| 8,250,080 B1 | 8/2012 | Guha et al. | |
| 8,301,650 B1* | 10/2012 | Oliver | G06F 17/30492 707/758 |
| 8,515,682 B2* | 8/2013 | Buhler et al. | 702/19 |
| 8,898,204 B1* | 11/2014 | Sathe | G06F 17/30 707/812 |
| 2003/0167275 A1* | 9/2003 | Rjaibi | G06F 17/30536 |
| 2005/0195832 A1* | 9/2005 | Dharmapurikar | H04L 45/7457 370/395.31 |

(Continued)

OTHER PUBLICATIONS

Deng, F. et al., "Approximately Detecting Duplicates for Streaming Data Using Stable Bloom Filters"; Jun. 27-29, 2006.

(Continued)

*Primary Examiner* — Jean B Fleurantin
*Assistant Examiner* — Nargis Sultana
(74) *Attorney, Agent, or Firm* — Trop, Pruner & Hu, P.C.

(57) ABSTRACT

A method of estimating a number of unique entry counts of an attribute in a database comprises, with a processor: identifying a sample of entries from an attribute database, determining frequencies of a number of input observations of the sample of entries, determining a number of high frequency values of the sample of entries, and estimating a number of unique entry counts of an attribute within the attribute database using a counting Bloom filter and based on the frequencies of the input observations and the high frequency values.

16 Claims, 5 Drawing Sheets

(56) References Cited

U.S. PATENT DOCUMENTS

| | | | |
|---|---|---|---|
| 2006/0294311 A1* | 12/2006 | Fu | G06F 17/30902 711/118 |
| 2008/0010683 A1* | 1/2008 | Baddour | G06F 17/30864 726/24 |
| 2008/0065639 A1* | 3/2008 | Choudhary | G06F 7/02 |
| 2008/0133561 A1* | 6/2008 | Dubnicki | G06F 11/1453 |
| 2008/0208856 A1* | 8/2008 | Lim | G06F 17/3071 |
| 2008/0243800 A1* | 10/2008 | Beyer | G06F 12/0864 |
| 2009/0187546 A1* | 7/2009 | Hamilton Whyte | H04L 9/3236 |
| 2009/0228433 A1* | 9/2009 | Aguilar Saborit | G06F 17/30489 |
| 2010/0082648 A1* | 4/2010 | Potapov | G06F 3/0611 707/756 |
| 2010/0114869 A1* | 5/2010 | Deolalikar | G06F 17/30463 707/718 |
| 2010/0114870 A1* | 5/2010 | Al-Omari | G06F 17/30445 707/718 |
| 2011/0231446 A1* | 9/2011 | Buhler | G06F 19/22 707/780 |
| 2012/0084287 A1 | 4/2012 | Lakshminarayan et al. | |
| 2012/0246189 A1* | 9/2012 | Castellanos | G06F 17/18 707/769 |
| 2012/0271940 A1* | 10/2012 | Di Pietro | H04L 63/0227 709/224 |
| 2013/0110794 A1* | 5/2013 | Lee | G06F 17/30303 707/692 |
| 2013/0226972 A1* | 8/2013 | Kosuru | G06F 17/3033 707/802 |
| 2014/0013052 A1* | 1/2014 | Sawin | G06F 12/0862 711/122 |
| 2014/0229489 A1* | 8/2014 | Low | G06F 17/30949 707/741 |

OTHER PUBLICATIONS

Lin, X. et al.; "Aggregate Computation Over Data Streams"; 2008.
Tarkoma, S. et al., "Theory and Practice of Bloom Filters for Distributed Systems"; 2012.

* cited by examiner

ESTIMATING UNIQUE ENTRY COUNTS USING A COUNTING BLOOM FILTER

BACKGROUND

Database servers are computing devices that store data in the form of databases. In order to store, modify, extract, add, delete, access, and analyze data stored within the databases, the database servers utilize a database management system (DBMS). The DBMS is a combination of hardware and software that provides tools to a user or administrator to assist in the management of the data within the database.

The DBMS may also be used to determine an estimated unique entry count (UEC) of a population of data within the database. However, determination of a UEC for a given key value may be computationally expensive in both the time it takes and the amount of processes performed.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

The present systems and methods compute histograms of a table in a relational database engine utilizing a counting Bloom filter. These systems and methods avoid the use of group-by and sort operators. The present DBMS employ sampling techniques to compute histograms on the sampled data, and use interpolation techniques to normalize the histograms for the total population. The present systems and methods also compute "frequencies of frequencies" of the sampled data using the counting Bloom filter, and facilitates the use of the Bloom filter in employing the sampling based techniques to estimate the unique entry count (UEC) of a population. The present systems and methods have applications in both static and incremental computation of the UEC.

The present disclosure, therefore, describes a method of estimating a number of unique entry counts of an attribute in a database and comprises, with a processor: identifying a sample of entries from an attribute database, determining frequencies of a number of input observations of the sample of entries, determining a number of high frequency values of the sample of entries, and estimating a number of unique entry counts of an attribute within the attribute database using a counting Bloom filter and based on the frequencies of the input observations and the high frequency values.

Further, the present disclosure describes a database management system (DBMS) for estimating a number of unique entry counts of an attribute in a database, and comprises a processor, and a memory device communicatively coupled to the processor. The memory device comprises a frequency of frequencies module to, when executed by the processor, determine frequencies of a number of input observations, a skewness module to, when executed by the processor, determine a number of high frequency values, and a unique entry count (UEC) estimating module to, when executed by the processor, estimate a number of unique entry counts of an attribute in an attribute database based on the frequencies of the input observations and the high frequency values using the counting Bloom filter.

Still further, the present disclosure describes a computer program product for determining a number of frequencies of frequencies values and a number of skew values estimating a number of unique entry counts of an attribute in a database, the computer program product comprising a non-transitory computer readable medium comprising computer usable program code embodied therewith. The computer usable program code comprises computer usable program code to, when executed by a processor, retrieve a subsequent observation of the number of input observations, computer usable program code to, when executed by a processor, compute $h_i(o)$ for i=1 to k, computer usable program code to, when executed by a processor, determine if all the corresponding k bits in the counting bloom filter are set to 1, and computer usable program code to, when executed by a processor, increment a UEC count if the subsequent observation has not been seen before and if all the corresponding k bits in the bloom filter are not set to 1.

The HP Nonstop SQL/MX and the HP SQ relational database management systems, both developed and sold by Hewlett-Packard Company, comprise cost-based optimizers. The cost-based optimizers compute costs based on sizes of the tables, selectivity of local predicates, selectivity of join predicates, and the estimated number of groups in a group-by expression. These cardinality estimates are based on histograms of unique entry count (UEC) estimates of a number of columns that appear in the predicates and/or elsewhere in a structure query language (SQL) query.

The histogram collection is performed through the update statistics statement that computes the pair of values UEC, row count for disjoint intervals over a range of the column values. The update statistics statement is a time consuming operation, and is a memory, CPU, and I/O intensive operation as it uses the group-by as well as the sort operations to compute the UEC of a column. DBMS systems utilize sampling so as to reduce the cost of this operation. This, in turn, reduces the size of input and improves response times.

The UEC computation performed by the present systems and methods may be static, dynamic, or a combination thereof. In a static UEC computation, the UEC is computed anew using sampling techniques from the entire file of records or from the entire table of tuples. In a dynamic UEC computation, the UEC is computed incrementally. Here, the UEC is adjusted based on newly changed records. In dynamic UEC computation, the systems and methods do not scan the file of records or from the entire table of tuples, but considers the newly added data within the updated table, and uses the previously computed UEC to compute a new UEC. As will be described in more detail below, the present systems and methods facilitate the computation of the UEC in both static and dynamic (i.e., incremental) settings.

To assist in computing UECs in a dynamic setting, the systems and methods calculate two new measures using the counting Bloom filter: frequencies of frequencies and high frequency values (i.e., skew values). The counting Bloom filter enables a very efficient and concise evaluation of frequencies of frequencies required for the unique entry count estimation performed by a UEC estimating module described in more detail below. Estimating techniques such as the Scholsser's estimation equation and the Jackknife estimation equation use the above two metrics during interpolation to complete estimates for the whole population.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
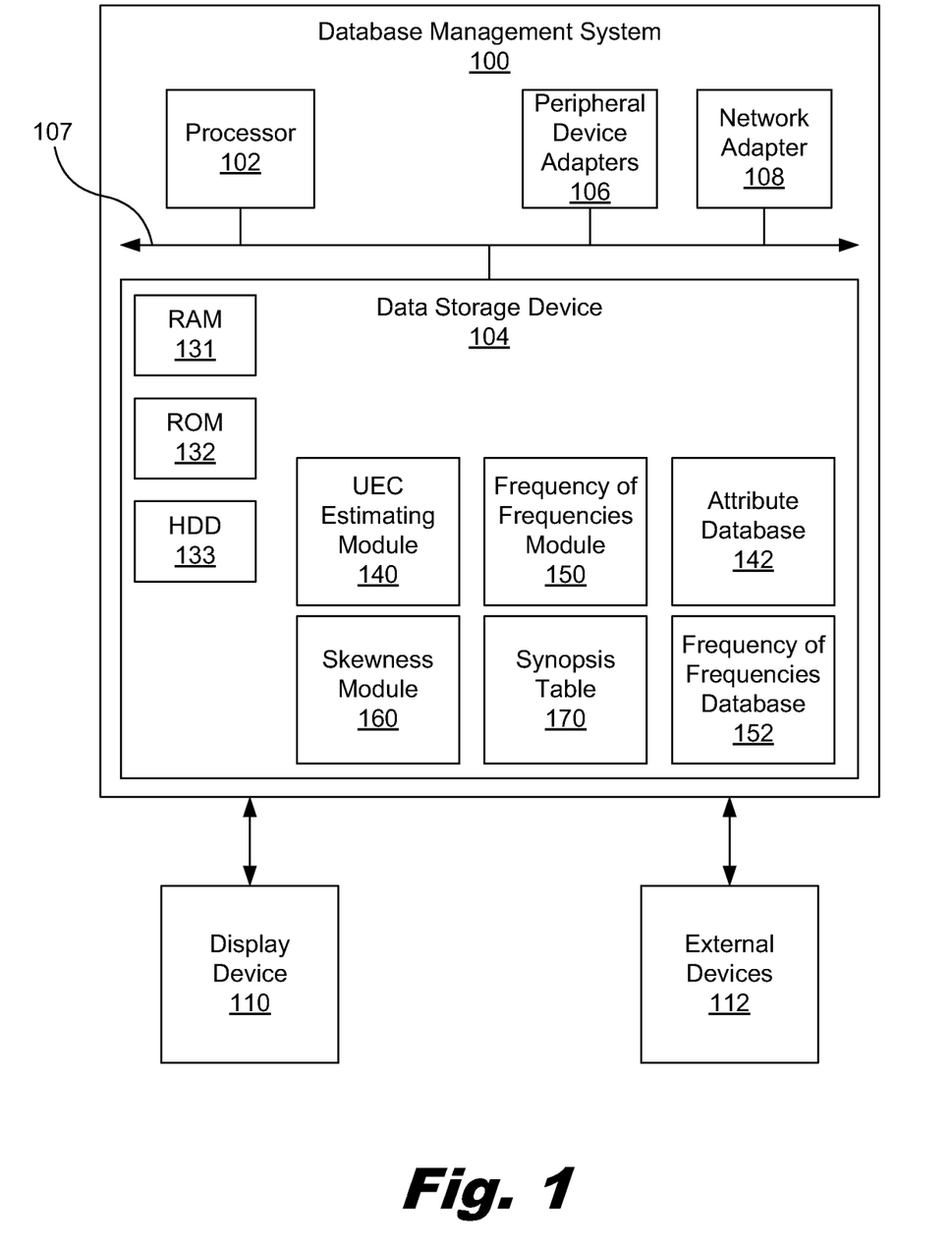
FIG. 1 is a block diagram of a database management system (DBMS) for estimating a unique entry count (UEC) of a population, according to one example of the principles described herein.

Turning now to the figures, FIG. 1 is a block diagram of a database management system (DBMS) (100) for estimating a unique entry count (UEC) of a population, according to one example of the principles described herein. The DBMS (100) is a computing device that performs the methods described herein. In one example, the methods provided by the DBMS (100) are provided as a service over a network by, for example, a third party. In this example, the services provided by the DBMS (100) may be provided as software as a service (SaaS), infrastructure as a service (IaaS), other forms of network services, or a combination thereof. In another example, the DBMS (100) is executed by a local administrator.

In one example, the DBMS (100) is a mobile computing device such as, for example, a mobile phone, smart phone, personal digital assistant (PDA), or a laptop computer with the capability of performing the methods described herein. In another example, the DBMS (100) is a desktop computing device. In another example, the DBMS (100) may be provided as a service by a network computing resource provider, an administrator, or a third party, among other entities. In the above examples, the DBMS (100) may be executed on a single computing device, or may be distributed and executed across a number of devices located at any number of locations.

To achieve its desired functionality, the DBMS (100) comprises various hardware components. Among these hardware components may be a number of processors (102), a number of data storage devices (104), a number of peripheral device adapters (106), and a number of network adapters (108). These hardware components may be interconnected through the use of a number of busses and/or network connections. In one example, the processor (102), data storage device (104), peripheral device adapters (106), and a network adapter (108) may be communicatively coupled via bus (107).

The processor (102) may include the hardware architecture to retrieve executable code from the data storage device (104) and execute the executable code. The executable code may, when executed by the processor (102), cause the processor (102) to implement at least the functionality of estimating a number of unique entry counts of an attribute in a database, determining frequency of frequencies, and determining a skewness of frequencies, according to the methods of the present specification described herein. In the course of executing code, the processor (202) may receive input from and provide output to a number of the remaining hardware units.

The data storage device (104) may store data such as executable program code that is executed by the processor (102) or other processing device. As will be discussed, the data storage device (104) may specifically store a number of applications that the processor (102) executes to implement at least the functionality described above.

The data storage device (104) may include various types of memory modules, including volatile and nonvolatile memory. For example, the data storage device (104) of the present example includes Random Access Memory (RAM) (131), Read Only Memory (ROM) (132), and Hard Disk Drive (HDD) memory (133). Many other types of memory may also be utilized, and the present specification contemplates the use of many varying type(s) of memory in the data storage device (104) as may suit a particular application of the principles described herein. In certain examples, different types of memory in the data storage device (104) may be used for different data storage needs. For example, in certain examples the processor (102) may boot from Read Only Memory (ROM) (132), maintain nonvolatile storage in the Hard Disk Drive (HDD) memory (133), and execute program code stored in Random Access Memory (RAM) (131).

Generally, the data storage device (104) may comprise a computer readable storage medium. For example, the data storage device (104) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. In another example, a computer readable storage medium may be any non-transitory medium that can contain, or store a program for use by or in connection with an instruction execution system, apparatus, or device.

The hardware adapters (106) in the DBMS (100) enable the processor (102) to interface with various other hardware elements, external and internal to the DBMS (100). For example, peripheral device adapters (106) may provide an interface to input/output devices, such as, for example, display device (110) or access other external devices (112). The display device (110) may be provided to allow a user to interact with and implement the functionality of the DBMS (100).

The peripheral device adapters (106) may also create an interface between the processor (102) and a printer, the display device (110), or other media output device. The network adapter (108) may provide an interface to other computing devices within, for example, a network, thereby enabling the transmission of data between the DBMS (100) and these other devices.

The DBMS (100) further comprises an attribute database (142). The attribute database (142) stores data associated with a number of attributes from among which a UEC is to be estimated. In one example, the attributes stored within the attribute database (142) are stored as tables, the tables comprising a number of columns. Each column represents an attribute that may be analyzed according to the systems and methods described herein.

The DBMS (100) further comprises a number of modules used within the DBMS (100) to estimate a unique entry count. The various modules within the DBMS (100) may be executed separately. In this example, the various modules may be stored as separate computer program products. In another example, the various modules within the DBMS (100) may be combined within a number of computer program products; each computer program product comprising a number of the modules. The various modules within the DBMS (100) may be stored within any data storage device including, for example, the RAM (131), ROM (132), and HDD (133) of the data storage device (104), or combinations thereof.

The DBMS (100) may comprise a UEC estimating module (140) to, when executed by the processor (102), estimate a number of unique entry counts of an attribute in, for example, a database. In one example, the UEC estimating module (140) is executed after the DBMS (100) determines a frequency of frequencies and a skewness value as will be described in more detail below.

The DBMS (100) may further comprise a frequency of frequencies module (150). The frequency of frequencies module (150) determines the frequencies of a number of input observations. These frequencies of frequencies are then used by the UEC estimating module (140) to estimate a number of unique entry counts of that attribute. The values obtained from the frequency of frequencies module (150) may be stored in, for example, the frequency of frequencies database (152) for retrieval and processing.

The DBMS (100) may further comprise a skewness module (160). The skewness module (160) determines a number of high frequency values (i.e., skew values). As described above, the skewness is the proportion of occurrence of distinct values in the population and the sample. The values obtained from the skewness module (160) may be stored in, for example, the synopsis table (170) for retrieval and processing.

Figure 2:
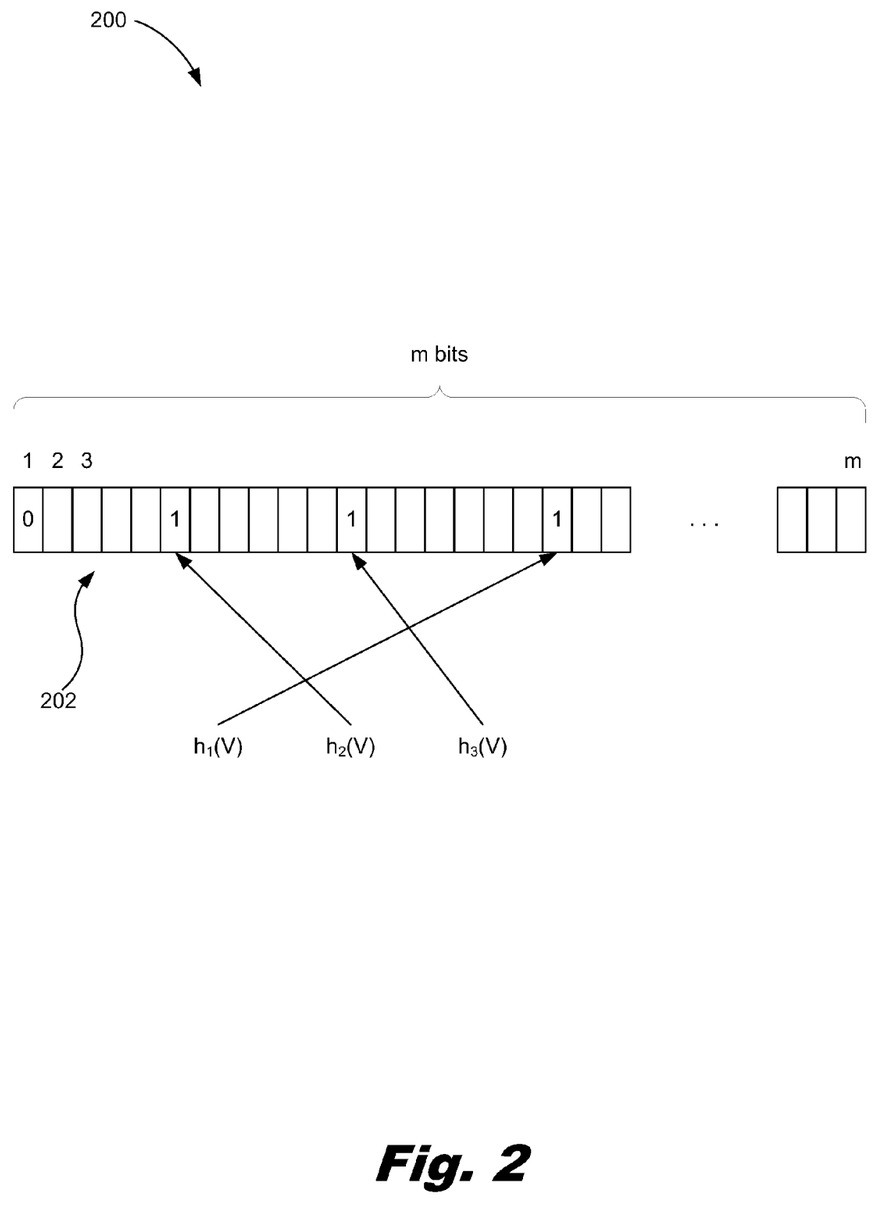
FIG. 2 is a diagram of an m bit vector depicting a number of counters, according to one example of the principles described herein.
Figure 3:
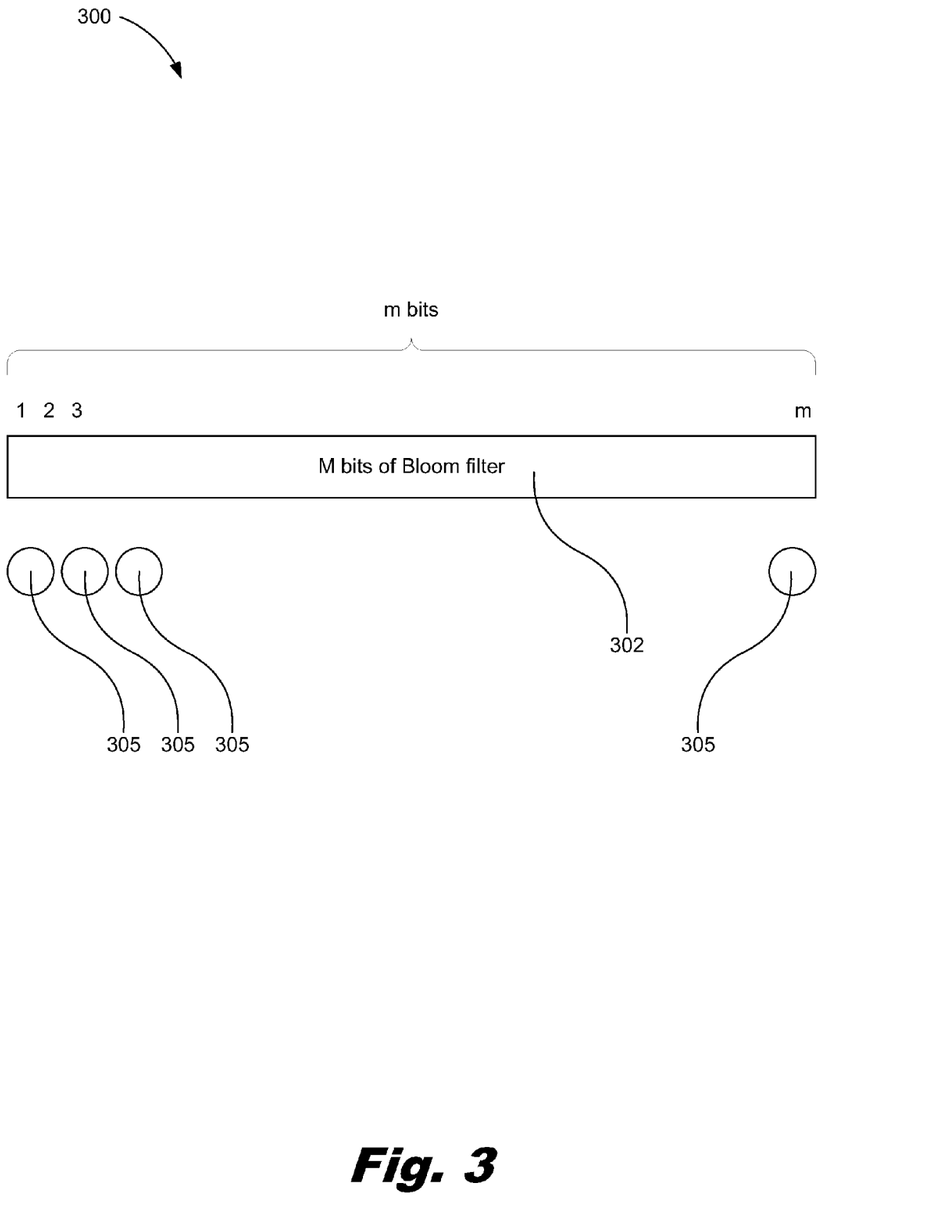
FIG. 3 is a diagram of an m bit vector, according to one example of the principles described herein.
Figure 4:
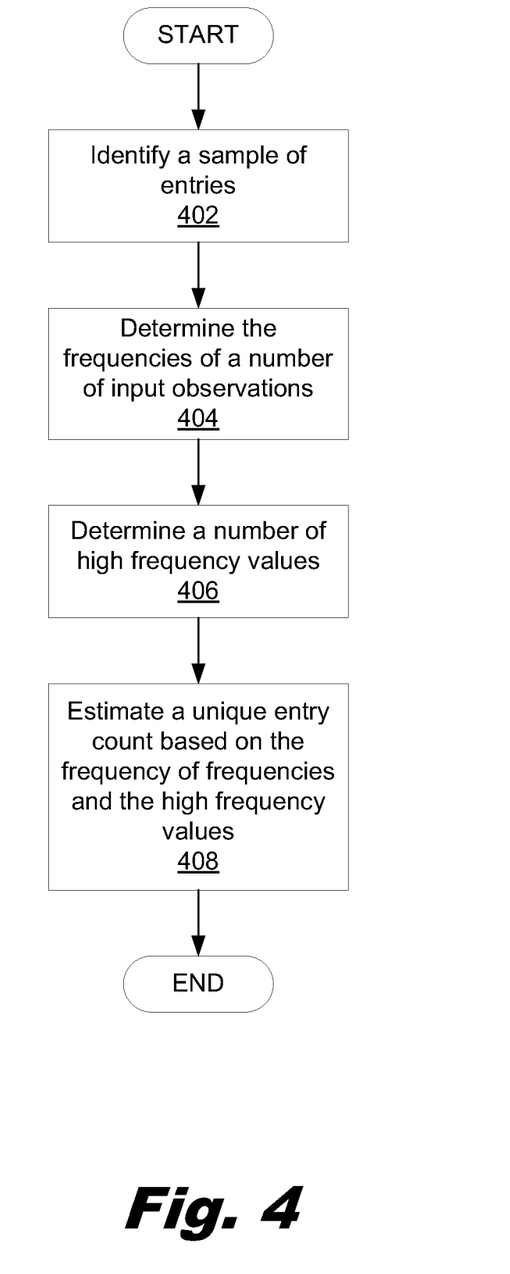
FIG. 4 is a flowchart showing a method of estimating a number of unique entry counts of an attribute in a database, according to one example of the principles described herein.

FIG. 4 is a flowchart showing a method of estimating a number of unique entry counts of an attribute in a database, according to one example of the principles described herein. FIGS. 2 and 3 will be described in connection with FIG. 4. The method depicted in FIG. 4 may begin with the processor (102) executing the UEC estimating module (140) to identify (block 402) a sample of entries from the attribute database (142). The UEC estimating module (140) may also receive information pertaining to the population size of the entries in the attribute database (142). According to an example, the DBMS (100) collects the samples at a pre-set time interval or upon demand and communicates the samples to the UEC estimating module (140). The number of samples or the percentage of the total population of entries that the samples make up may also be identified. The DBMS (100) may obtain a predetermined sampling percent or may be user defined or controlled to vary the sampling percent of the total population on a query by query basis. Various sampling techniques may be employed such as, for example, block sampling or row sampling.

The method depicted in FIG. 4 may continue with the processor (102) executing the frequency of frequencies module (150) to determine (block 404) the frequencies of a number of input observations. Further, the processor (102) executes the skewness module (160) to determine (block 406) a number of high frequency values (i.e., skew values). Sample-based UEC estimation is modulated by the sampling fraction and the skewness in the data. The sampling fraction is the ratio of sample size, and the column cardinality is denoted by q. The skewness is the proportion of occurrence of distinct values in the population and the sample. The term skewness is given by the following equation0:

$$\text{Skewness} = \frac{\sum_{j=1}^{d}(n_j - \bar{n})^3/d}{\left[\sum_{j=1}^{d}(n_j - \bar{n})^2/d\right]^{3/2}} \quad \text{Eq. 1}$$

where $n_j$ is the number of occurrences of a value "j" in the database column, and d is the number of unique values. Estimators may perform differently under varying skewness conditions and sampling fractions in the data. In the present disclosure, the size of the sampling fraction is less of a concern because sampling size n is the minimum of 1,000,000 and q=1%. Thus, q=min(1000000,1%). In one example, since the performance of a given estimator is variable under various skewness conditions, it may be advantageous to combine a number of estimators depending on the skewness.

The estimator implemented in SQL/MX combines a version of the Schlosser estimator referred to as Schlosser3 and a variant of the Jackknife estimator referred to as the Unsmoothed $2^{nd}$ Jackknife estimator. Their functional forms are given below. The Schlosser version is:

$$\hat{D}_{Sh3} = d_n + f_1 \left( \frac{\sum_{i=1}^{n} iq^2(1-q^2)^{i-1} f_i}{\sum_{i=1}^{n}(1-q)^{i-1}[(1+q)^i - 1] f_i} \right) \left( \frac{\sum_{i=1}^{n}(1-q)^i f_i}{\sum_{i=1}^{n} iq(1-q)^{i-1} f_i} \right) \quad \text{Eq. 2}$$

The second order Jackknife is given by:

$$\hat{D}_{uj2} = \left(1 - \frac{f_1(1-q)}{n}\right)^{-1} \left(d_n - \frac{f_1(1-q)\ln(1-q)\hat{\gamma}^2(\hat{D}_{uj1})}{q}\right) \quad \text{Eq. 3}$$

where $$\hat{D}_{uj1} = \left(1 - \frac{f_1(1-q)}{n}\right)^{-1} d_n, \quad \text{Eq. 4}$$

and $$\hat{\gamma}^2(D) = \text{Max}\left(0, \frac{D}{n^2}\sum_{i=1}^{n} i(i-1)f_i + \frac{D}{N} - 1\right). \quad \text{Eq. 5}$$

The estimators are utilized based on the values of the skewness and the $f_i$ (i.e., frequency of frequencies) which appear both in Schlosser and Jackknife.

As an example, suppose there exists the following input: 23, 32, 23, 12, 32, 13, 14, 34, 23, 32. In this input, observations 23 and 32 have frequencies of 3 each. Observations 12, 13, 14, and 34 have frequencies of 1 each. In this example, $x_2=0$ since no observation has frequency 2. Thus, $x_1=4$, $x_2=0$, and $x_3=2$. Sample size is 10 since there are ten input values. The mean is 6/10=0.6, and d=3 since there are 3 unique frequencies: 1, 2, and 3. Thus, skewness=1.14 according to Eq. 1.

To follow is a description regarding high frequency counts. The above frequency of frequency counts is computed for the first N frequencies where N may be in the hundreds or thousands in order to control memory usage. Also, the present systems and methods capture values with high frequency counts and stores and presents the values in a data structure called a "Synopsis Table." In one example, the data defining the synopsis table (FIG. 1, 170) may be stored in, for example, the data storage device (104) of the DBMS (100). In another example, the data defining the synopsis table (FIG. 1, 170) may be stored in a storage device external to the DBMS (100).

Turning again to the high frequency counts, in one example, it may be desirable to capture frequencies that are more than a million in a 100 million population. These are skewed frequencies. The bloom filter's use as a way to encode values of a column, and the method used to compute the two measures will be described in more detail below.

For a given column of a table, the (UEC, row count) pairs are estimated for each interval while improving performance relative to existing statistics collection methods. In particular, the frequencies of frequencies and the high frequency values are computed (blocks 404 and 406). This assists in estimating the UEC value for the entire population based on sampled data.

Thus, the method of FIG. 4 continues with the processor (102) executing the UEC estimating module (140) to estimate (408) a unique entry count for an attribute based on the frequencies of frequencies and the high frequency values determined at blocks 404 and 406, respectively. Let there be an in bit vector where each bit is set to zero. FIG. 2 is a diagram (200) of an m bit vector (202), according to one example of the principles described herein. This vector (202) is referred to as a bloom filter. Let there be n input values to encode in the filter. Assume k number of hash functions. Each hash function $h_i$ takes a column value v as input, and outputs a number in $\{1, \ldots, m\}$. The $h_i(v)^{th}$ bit is set in the vector to 1 for each i ranging from 1 to k. As mentioned above, Bloom filters are used to test membership queries. To test if a value V is already present in the filter, the k hash functions are applied on the value. If any of the k bits from the filter return zero, then the value V does not exist in the filter; that is, it is not a member. If all bits return one, then the value probably is a member.

There is a small, but non-zero probability that the value does not exist but it may be concluded that it does because all k bits are set to one. This false positive probability p is determined by the following:

$$p = (1 - e^{(-kn/m)})^k \quad \text{Eq. 6}$$

For a desired set of p, n, and k values, the number of bits needed (m) may be calculated using the following:

$$m = -\frac{kn}{\left(\ln\left(1 - p^{\frac{1}{k}}\right)\right)} \quad \text{Eq. 7}$$

If n is set to be one million column values and p is set to be 0.001, and k is set to be 5, then the in number of bits needed is 16.48 MB. If p is increased to 0.01, then in is 9.39 MB. Thus, the more memory present, the more accurate the bloom filter is.

FIG. 3 is a diagram (300) of an m bit vector (302) depicting a number of counters (305), according to one example of the principles described herein. A counting Bloom filter is a Bloom filter comprising the additional data structure of counters. As depicted in FIG. 3, there is one counter (305) for each bit of the Bloom filter. In one example, the counters (305) may be variably sized to reduce memory consumption.

The bloom filter performance may at least partially depend on availability of fast hash functions. Several hash functions were constructed using ideas from Peter K. Pearson, *Fast Hashing of Variable Length Text Strings*, June 1990 Volume 33, CACM, which is hereby incorporated by reference in its entirety. With regard to the details, an array S of 255 random values may be constructed. The random values may be obtained from an online random number generator such as, for example, www.random.org, or could be generated by a pseudo random number generator with the restriction that each generated value is in range {0 . . . 255} inclusive so that it needs at most one byte in storage. If it is assumed that the hash function returns a 64 bit unsigned integer, then the following pseudo code is an example hash function. The hash function takes a string of characters as input and returns a 64 bit unsigned integer as output.

---
Hash Function Pseudo-Code 1
---
```
unsigned long Hash1(char * str)
{
// use identity I & 7 = I mod 8 where & is bitwise AND and mod is a
modulo function
    unsigned char h[ ]={0,15,127,255,31,131,199,249};
// h is 8-byte character array populated with random values; each value is
// less than 256.
    for(int i = 0; str[i] !='\0'; i++)
    {
      h[i&7] = S[(h[i &7]) ^ (str[i])];
    }
// ^ : bit wise XOR
    return (h[3] << 24) + (h[2] << 16)+(h[1]<<8)+h[0]+
        (h[6]<<48)+(h[5]<<40)+(h[4] << 56) + (h[7] << 32);
}
```
---

The value returned by the hash function is transformed, and is used as an index into the above m-bit bloom filter to assist in determining if an input value has been seen before or not. It is also used to update corresponding counters.

Below is pseudo-code referred to as the "Bloom Frequency Count" that computes frequencies of frequencies. The pseudo-code uses a subroutine called getFrequency( ), and this method takes an observation as an input and returns the frequency of the observation in the Bloom filter.

---
Pseudo-Code 1: Bloom Frequency Count
---
```
unsigned long getFrequency(char * str)
{
// Suppose we use 5 hash functions for the Bloom filter
// we increment the corresponding 5 counters after applying the hash
// functions on the observation; assume observation is of type string
    Return minimum of the five counters for a given observation as the
    frequency.
}
```
---

Figure 5:
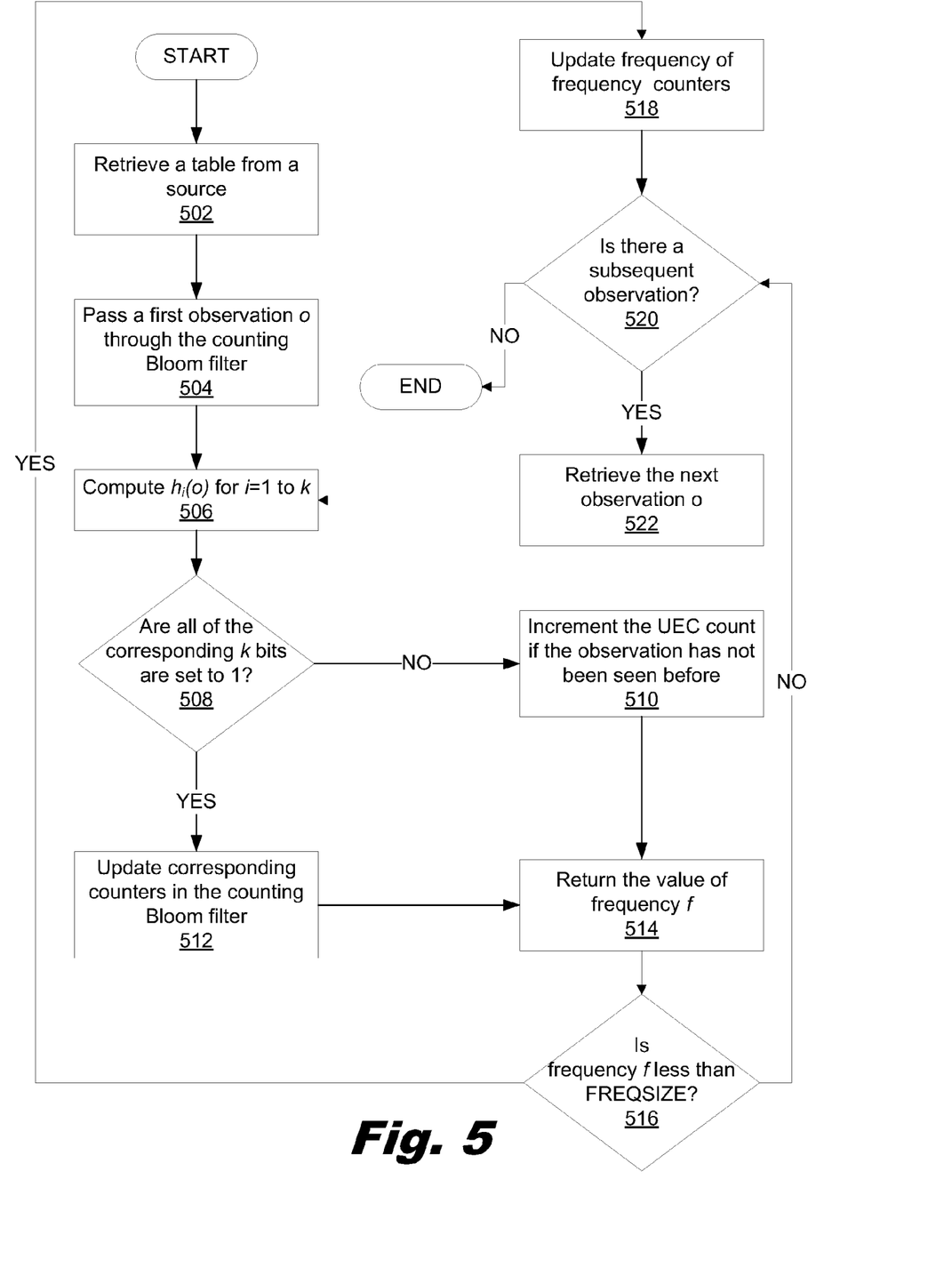
FIG. 5 is a flowchart showing a method of estimating a number of unique entry counts of an attribute in a database, according to another example of the principles described herein.

FIG. 5 is a flowchart showing a method of estimating a number of unique entry counts of an attribute in a database, according to another example of the principles described herein. The above-described Bloom Frequency Count may be expressed as follows in connection with FIG. 5. Let the input be a table of one column without loss of generality. The processor (102) of the DBMS (100) retrieves (block 502) a table having those attributes from a source such as, for example, the attribute database (142). Let there be an array "FREQCOUNT" of a given size "FREQSIZE." The pseudo-code finds frequencies up to frequencies of this size. The processor, for a first observation passes (block 504) the observation through the counting Bloom filter. At block 506, the processor computes $h_i(o)$ for i=1 to k.

The processor (102) determines (block 508) if all the corresponding k bits in the Bloom filter are set to 1. If all the corresponding k bits in the Bloom filter are not set to 1 (block 508, Determination NO), then the processor increments (block 510) the UEC count if this observation has not been seen before. If all the corresponding k bits in the Bloom filter are set to 1 (block 508, Determination YES), then the processor updates (block 512) corresponding counters in the counting Bloom filter without updating the UEC count.

The processor executes the function getFrequency(o) to return (block 514) value of f. The processor (102) determines (block 516) if the frequency f is less than FREQSIZE. If the frequency f is less than FREQSIZE (block 516, Determination YES), then the processor (102), executing the hash function, updates (block 518) the frequency of frequency counters. In one example, the processor (102) computes the frequency of frequencies when frequency f equals FREQSIZE. In this example, the value at which the processor computes the frequency of frequencies is configurable or user definable.

If the frequency f is not less than FREQSIZE (block 516, Determination NO), then the processor (102) determines (block 520) if there is a subsequent observation o. Similarly, the processor (102) determines (block 520) if there is a subsequent observation o after block 518. If there is not a subsequent observation o (block 520, Determination NO), then the process terminates. Static UEC computation is performed by reprocessing the entire computation from scratch, reading all data again, and computing group by aggregates. However, as described above, dynamic UEC computation is more efficient in that dynamic UEC computation looks at the updated data and updates the UECs. The present systems and methods may be applied to both static and dynamic methods of computing UEC, or combinations thereof.

If there is a subsequent observation o (block 520, Determination YES), then the processor (102) retrieves (block 522) the next value o, and computes (block 506) $h_i(o)$ for i=1 to k. The process loops in this manner until there is not a subsequent observation o (block 520, Determination NO).

The computation and production of the synopsis table (FIG. 1, 170) where skewed values are maintained will now be described. The synopsis table (FIG. 1, 170) stores observations along with frequencies when the frequency is high. The synopsis table (FIG. 1, 170) may comprise less than 100 entries. This is because there are only a few skewed values. A map is maintained using observation values as a key to quickly find the skewed values. An entry in the synopsis table (FIG. 1, 170) may also be found based on the frequency. The data structure quickly finds those entries as well. The frequencies are adjusted whenever an entry is replaced. The replaced frequency is doubled; that is, it gets frequency of new observation+frequency of replaced observation. The below experimental results demonstrate that the above methods work well in practice.

A prototype of the bloom filter and the code to calculate the frequencies of frequencies metric was written. In this example, a million integers are read into the Bloom filter, and the frequency of all observations that occur exactly i times are calculated where i ranges from 1 to 90. This experiment was repeated with files containing 20 and 40 million records in two additional experiments, respectively. The latter file contained much more skew with UEC among the cases in which the files did not contain much skew, as evidenced by entries in the synopsis table (FIG. 1, 170). Six hash functions were used for this experiment. Eight bits were allocated for each observation.

TABLE 1

Experimental Results

| | Size | Frequency of frequencies (freq, number of occurrences) | Synopsis Table |
|---|---|---|---|
| Exp. 2 | 20 Million with UEC estimate 19057640 | (1, 18139971) (2, 893247) (3, 24158) (4, 259) (5, 5) | All frequencies small; no skew |
| Exp. 3 | 40 Million with UEC estimate 25294517 | (1, 24135213) (2, 1114762) (3, 43843) (4, 392) (5, 3) | (2 values, 609175) (2 values, 560161) (several, 49015) |

As demonstrated above in Table 1, there is almost no skew in the 20 million population as evidenced by the fact that there are 4 entries in the frequency of frequency data structure.

In the frequency distribution continuum, there are some that occur only once and some that occur twice. There are those that occur an average number of times where the average is defined to be RowCount/UEC. There are some values whose frequency is high, and these are the skewed values. By definition, the skewed values are fewer, else they would not be skewed values if there are several distinct such occurrences. The above framework nicely captures those frequencies at the lower and higher end, ignoring the average case. Using these computations, interpolation may be performed using an estimator, or, specifically, the UEC estimating module (FIG. 1, 140). Thus, the above methods provide an advancement by computing these values using a counting Bloom filter.

Aspects of the present system and method may be used to compute histograms of a table stored within, for example, the attribute database (142). The present DBMS (100) employs sampling techniques to compute histograms on the sampled data, and uses interpolation methods to normalize the histograms for the total population. In one example, this information associated with a computed histogram may be out put to a user of the DMBS (100) via, for example, the display device (110) or a printing device.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (102) of the DBMS (100) or other programmable data processing apparatus, implement the functions or acts specified in the flowchart and/or block diagram block or blocks. In one example, the computer usable program code may be embodied within a computer readable medium; the computer readable medium being part of the computer program product. In another example, a computer readable medium may be any non-transitory medium that can contain, or store a program for use by or in connection with an instruction execution system, apparatus, or device. In still another example, the computer usable program code may be embodied within a computer readable storage medium.

The specification and figures describe methods of and systems for estimating a number of unique entry counts of an attribute in a database comprises, with a processor: identifying a sample of entries from an attribute database, determining frequencies of a number of input observations of the sample of entries, determining a number of high frequency values of the sample of entries, and estimating a number of unique entry counts of an attribute within the attribute database using a counting Bloom filter and based on the frequencies of the input observations and the high frequency values. This estimation of unique entry counts using a counting bloom filter may have a number of advantages, including: (1) it presents new bloom filter based techniques to estimate frequencies of frequencies and skewed values. The two measures are used in interpolating the UEC value for the entire population. (2) the techniques are applicable in incremental UEC computation as well as static UEC computation.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of estimating a number of unique entry counts of an attribute in a database comprising, with a processor:
    identifying a sample of entries from an attribute database;
    determining frequencies of a number of input observations of the sample of entries, the determining comprising:
        retrieving a subsequent observation o of the number of input observations,
        computing a hash function, $h_i(o)$, for i=1 to k,
        determining if all the corresponding k bits in the counting Bloom filter are set to 1, and
        if all the corresponding k bits in the counting Bloom filter are not set to 1, then incrementing a UEC count if the subsequent observation o has not been seen before;
    determining a number of high frequency values of the sample of entries: and
    estimating a number of unique entry counts of a n attribute within the attribute database using a counting Bloom filter and based on the frequencies of the input observations and the high frequency values,
    wherein the counting Bloom filter comprises a plurality of counters, the plurality of counters comprisin g a counter for each bit of the counting Bloom filter.

2. The method of claim 1, further comprising:
    retrieving a table having those attributes from a source;
    passing the observation through a counting Bloom filter for a first observation O; and
    updating the corresponding k counters.

3. The method of claim 1, further comprising:
    incrementing a number of corresponding k counters;
    returning a value for frequency f;
    determining if the frequency f is less than FREQSIZE;
    if the frequency f is less than FREQSIZE, then updating a counter for the respective frequency of frequency, and retrieve the next observation.

4. The method of claim 1, in which the method is performed for a static UEC computation, a dynamic UEC computation, or combinations thereof.

5. The method of claim 1, further comprising determining a false positive probability based on a number of hash functions used to determine if an input value has been seen before, a number of entries in the sample of entries, and a bit vector representing the counting Bloom filter.

6. The method of claim 1, further comprising utilizing a number of hash functions to determine if an input value has been seen before to determine uniqueness of a value using the counting Bloom filter.

7. The method of claim 1, in which determining a number of high frequency values of the sample of entries is performed using the counting Bloom filter.

8. The method of claim 7, further comprising maintaining a synopsis table.

9. A database management system (DBMS) for estimating a number of unique entry counts of an attribute in a database, comprising:
    a processor; and
    a memory device communicatively coupled to the processor, the memory device comprising:
        a frequency of frequencies module to, when executed by the processor, determine frequencies of a number of input observations, the determining comprising:
            retrieving a subsequent observation o of the number of input observations,
            computing a hash function, $h_i(o)$, for i=1 to k,
            determining if all the corresponding k bits in the counting Bloom filter are set to 1, and
            if all the corresponding k bits in the counting Bloom filter are not set to 1, then incrementing a UEC count if the subsequent observation o has not been seen before;
        a skewness module to, when executed by the processor, determine a number of high frequency values; and
        a unique entry count (UEC) estimating module to, when executed by the processor, estimate a number of unique entry counts of an attribute in an attribute database based on the frequencies of the input observations and the high frequency values using the counting Bloom filter,
        wherein the counting Bloom filter comprises a plurality of counters, the plurality of counters comprising a counter for each bit of the counting Bloom filter.

10. The DBMS of claim 9, further comprising a n output device to output a representation of a number of histograms, in which the histograms define the unique entry count (UEC) of attribute in a n attribute database.

11. The DBMS of claim 9, further comprising a synopsis table stored within the memory device, in which the synopsis table stores skew values and their corresponding observations and frequencies.

12. The DBMS of claim 9, further comprising a frequency of frequencies database stored within the memory device, in which the frequency of frequencies database stores values obtained from the frequency of frequencies module.

13. A computer program product for determining a number of frequencies of frequencies values and a number of skew values estimating a number of unique entry counts of a n attribute in a database, the computer program product-comprising:

a non-transitory computer readable medium comprising computer usable program code embodied therewith, the computer usable program code to, when executed by a processor:
 retrieve a subsequent observation of a number of input observations;
 compute a hash function, $h_i(o)$ for i=1 to k;
 determine if all the corresponding k bits in a counting Bloom filter are set to 1;
 increment a unique entrysount if the subsequent observation has not been seen before and if all the corresponding k bits in the counting Bloom filter are not set to 1; and
 determining a false positive probability based on the k bits in the counting Bloom filter, an n number of entries in a sample of entries of the attribute, and an m bit vector representing the counting Bloom filter.

14. The computer program product of claim 13, further comprising:
 computer usable program code to, when executed by a processor, retrieve a table having those attributes from a source;
 computer usable program code to, when executed by a processor, pass the observation through a Bloom filter for a first observation O; and
 computer usable program code to, when executed by a processor, update corresponding counters.

15. The computer program product of claim 13, further comprising:
 computer usable program code to, when executed by a processor, increment a number of corresponding k counters;
 computer usable program code to, when executed by a processor, return a value for frequency f;
 computer usable program code to, when executed by a processor, determine if the frequency f is less than FREQSIZE;
 computer usable program code to, when executed by a processor, update a frequency of frequency counter if the frequency f is less than FREQSIZE; and
 computer usable program code to, when executed by a processor, retrieve a next observation.

16. The computer program product of claim 13, wherein the counting Bloom filter comprises a plurality of counters, the plurality of counters comprising a counter for each bit of the counting Bloom filter.

\* \* \* \* \*